Figure 1A:
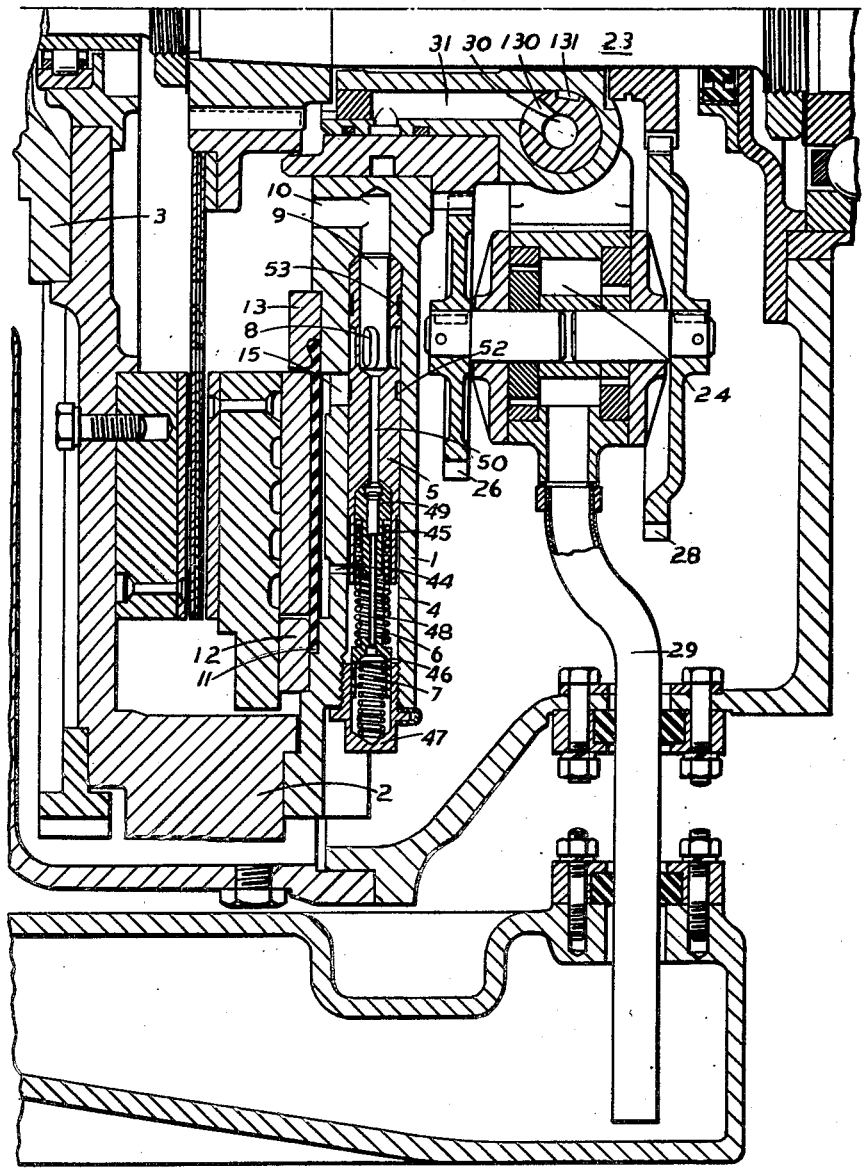

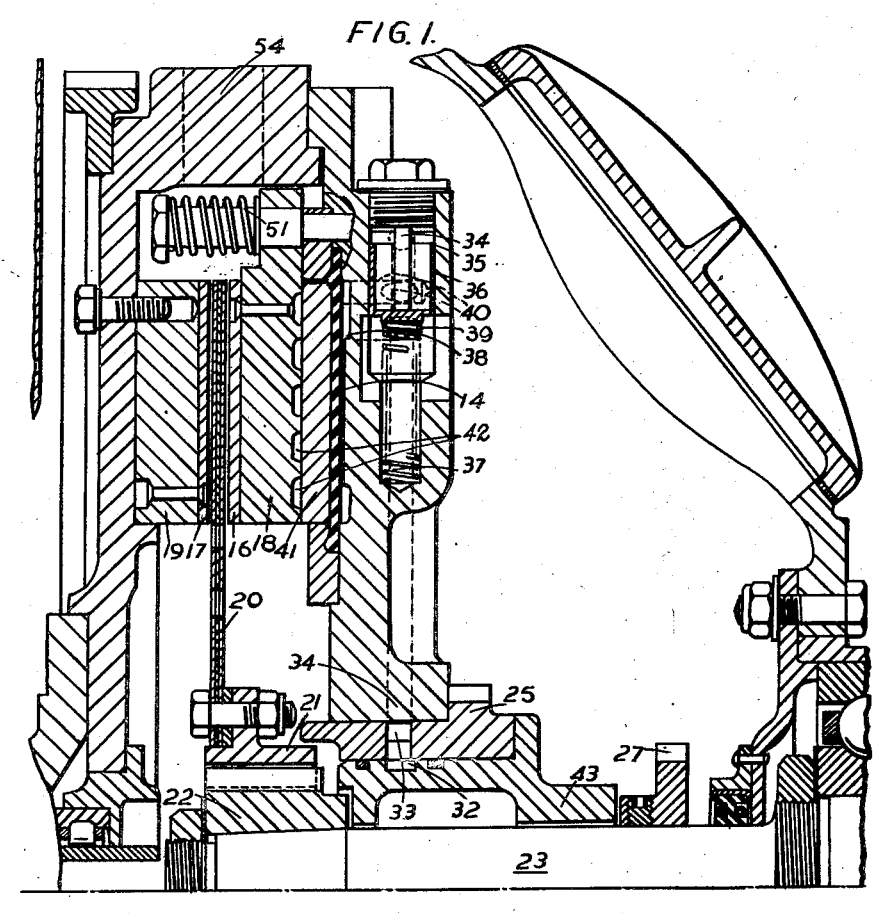

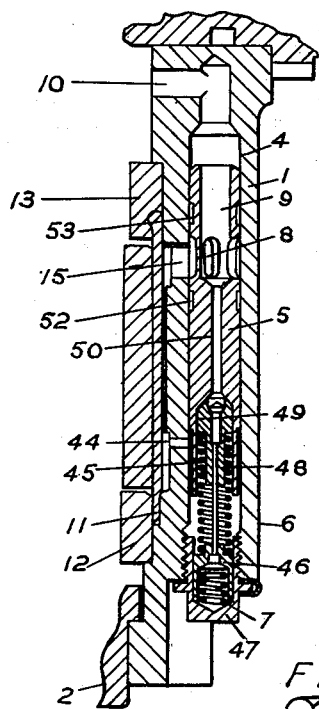
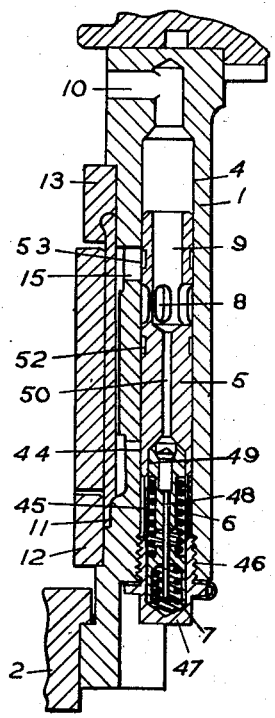
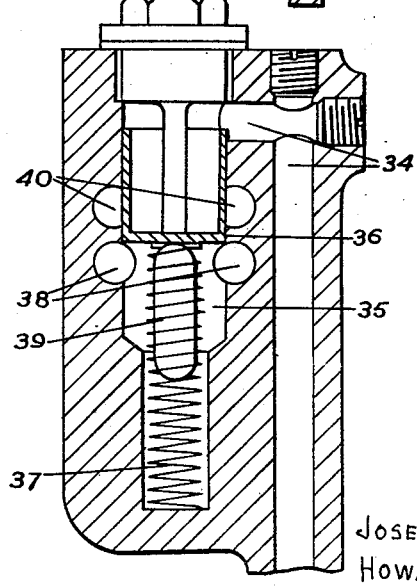
INVENTORS
JOSEPH ARTHUR THOMPSON
HOWARD FREDERICK HOBBS Patented Oct. 6, 1953

2,654,381

UNITED STATES PATENT OFFICE 2,654,381

VARIABLE-RATIO POWER TRANSMITTING APPARATUS

Joseph Arthur Thompson and Howard Frederick Hobbs, Leamington Spa, England, assignors to Hobbs Transmission Limited, Leamington Spa, England, a British company Application June 2, 1948, Serial No. 30,556
In Great Britain June 20, 1947

2 Claims. (Cl. 137—56)

This invention relates to hydraulically actuated friction clutches of the kind having a rotary housing carried by an input member, an output member, friction elements carried by the housing and output member, a space or spaces in the rotary housing for liquid under pressure, and means (for example a flexible diaphragm) whereby the pressure of oil or other liquid in said space is utilised for applying engaging pressure between the friction elements.

It has been proposed to employ a centrifugally operated valve in clutches of this type so that below some predetermined speed of the input member the valve will open the oil pressure from the said space to exhaust, thus permitting the clutch to become disengaged, and similarly on exceeding some given speed the clutch becomes engaged thereby relieving the operator of the need for manual manipulation.

A disadvantage with known arrangements is that if the input member is stationary the centrifugal valve is located in its open position and even though oil pressure is available, for example from an output driven pump, the valve must be moved towards its shut position before it is possible to engage the clutch.

If it is desired, for example, to be able to start a vehicle engine by towing with this type of clutch fitted it is necessary to provide some means whereby the valve can be moved to its shut position so as to retain sufficient pressure to enable the clutch to be engaged. An alternative means of doing this is to arrange for the oil pressure to act on the inner end of the valve so as to move it towards its shut position. Such an arrangement introduces more complication and increased cost.

According to the present invention the rotary housing carries a centrifugally operated valve constructed so as to relieve the oil pressure in the said space at certain predetermined range of speeds, and to retain the pressure at both lower and higher speeds of said rotary housing.

In order that the invention may be readily carried into effect one constructional form thereof will now be described by way of example with reference to the accompanying drawings, wherein:

Figures 1 and 1A together constitute a sectional view of the clutch assembly made in accordance with the present invention.

Fig. 2 is a fragmentary view of Fig. 1A showing the piston valve in another position, Fig. 3 is a view similar to that of Fig. 2 showing the piston valve in still another position, Fig. 4 is a fragmentary sectional view of another piston valve taken at right angles to that of Fig. 1.

The rotary housing is constituted by the engine flywheel 2, which is carried by the engine crankshaft 3, and a plate 1 attached to the flywheel. The rotary housing plate 1 is provided with a radially disposed cylindrical bore 4 which carries a slidable valve element or piston 5. This piston has exhaust ports 8 communicating with a central bore 9 that leads to exhaust bores 10 in the housing at the inner end of the piston. The piston also has a small central bore 50 leading to its opposite end where it is drilled out to a large diameter to receive an abutment block 49 which is linked by a rod 48 to a cup member 46 located within a cap 47 that is screwed into the outer end of the bore 4 to close it at that end. The rod 48 is headed at both ends so as to limit movement of the rod in relation to the cup 46 and the abutment 49. A light spring 7 is disposed between the cup 46 and the cap 47 and a stronger spring 6 is disposed between the cup 46 and the abutment 49. The springs 6, 7 serve to urge the piston inwards where it abuts against the inner end of the bore. A synthetic rubber faced diaphragm 11 is clamped to the rotary housing plate by rings 12, 13 and the rotary housing is provided with an annular recess 14 which forms a space for liquid. An exhaust port 15 in the plate 1 connects the space with the cylindrical bore 4. Pressure in the space 14 serves to engage a friction clutch plate 20 between the friction facings 16, 17 which are carried by the pressure plates 18, 19. The clutch plate 20 is carried by a splined hub 21 which mates with a part 22 on an output shaft 23. A duplex oil pump 24 supplies oil to the space 14, one part of the pump being driven by gears 25, 26 from the rotary housing and the other part of the pump by gears 27, 28 from the output shaft 23. The two parts of the pump have a common delivery and common suction 29. The suction pipe 29 dips into an oil sump 129 which is connected by a pipe 128 with the gear housing 127. The pump delivers oil under pressure to the interior bore of a manually controlled valve 30 which can direct the pressure supply from the two parts of the pump through a port 130 to a duct 31 which leads to grooves 32, 33 and a duct 34. The valve is rotatable by any suitable known means for example by an arm attached to it and connected by a cable or rod to a control lever so that the valve member 30 can be rotated into its different positions by actuation of the control lever. The valve can connect the duct 31 to exhaust through a port 131. The duct 34 leads to the outer end of a cylindrical bore 35. A piston valve 36 is slidable in the bore 35 and is urged outwards by a spring 37. The mass of the valve 36 and spring 37 is such as to balance against centrifugal head developed on the oil in the duct 34. With the valve 36 in the outer position as shown, the space 14 is opened to exhaust through ports 38, 39. If the pressure from the pump is opened to the duct 34 the valve 36 will be moved inwards closing the exhausts 38, 39 and opening the liquid supply duct 34 to a port 40. The space is then filled through the port 40 in one position of the valve but can be emptied through the port 38 in another position of the valve. The ports 38, 40 are duplicated and arranged at each side of the valve. The insulator plate 41 separates the diaphragm 11 from the pressure plate 18, and a series of annular grooves 42 which are connected together to the inner and outer diameters of the pressure plate by slots provide a path for liquid for the purpose of cooling and providing lubricant to the plate 41 and the diaphragm 11. The clutch plate 20 comprises three separate plates and the centre plate is slotted so as to provide a path for the circulation of liquid for cooling. The liquid is circulated to the clutch plates through the exhaust 10.

The operation of the centrifugal valve 5 is as follows: When the rotary housing 1 is stationary or rotating at a predetermined low speed the valve is held in its innermost position as shown in Figure 1A, by the springs 6, 7. In this position the ports 8 do not mate with the port 15, and should the shaft 23 be rotated, such as by towing the vehicle for the purpose of starting the engine, the gear 27 will drive the gear 28 and the one portion of the pump 24. The pressure delivered by the pump will be led to the space 14, the valve 30 having been suitably positioned. The clutch will be engaged causing the housing 1, flywheel 2, and crankshaft 3 to be rotated. The pressure in the space 14 reaches the cylindrical bore 4 by means of the drilling 44 and the clearance at the outer end of the valve shown 45. Since this pressure will act on the outer end of the valve 5 it will assist the springs 6, 7 to maintain the valve in its innermost position and hence, should the engine be difficult to start, it can be rotated at relatively high speeds while still maintaining the valve in its innermost position. By closing the valve 30 the pressure in the space 14 will be relieved and the liquid emptied through the port 39 by reason of the return of the valve 36 to its outer position, there being sufficient oil leakage for this purpose. During normal running at engine idling speeds there is no substantial pressure in the space 14 and the drilling 44, the centrifugal force on the valve 5 being sufficient to compress the spring 7 causing the cup 46 to abut against the cap 47 and the valve to be positioned with ports 8 in alignment with the port 15. At this speed the force of the valve will be insufficient to compress the spring 6. During this condition of operation the valve 30 may be positioned to connect the delivery of pump 24 to the space 14 and the clutch will remain disengaged since the liquid delivered by the pump will circulate through the space 14, to ports 15, 8 and ducts 9, 10. It will be observed that the space 14 will remain filled since duct 10 is at a smaller radius. Some of the liquid so circulated will pass through the grooves 42 and through plate 20. The remainder of the liquid will pass between the plate and the friction facings 16, 17 causing the friction surfaces to become well lubricated. The circulated liquid escapes through holes 54. The springs 51 will provide sufficient force to overcome centrifugal force on the liquid and any back pressure developed when the clutch is disengaged by means of the valve 5. The groove 52 aligns with the port 15 when the valve is in its inner position and the groove 53 when in its outer position. The purpose of the grooves is to prevent cross binding by allowing the liquid pressure to surround the valve. When the speed of the engine is increased above a predetermined idling speed the centrifugal force on the valve 5 will be sufficient to overcome the force from the spring 6 and the valve will move to its outer position, in which case the ports 8 will have passed beyond the port 15 causing the pressure to be retained within the space 14 and the clutch to be engaged. It will be understood, therefore, that over a certain range of speeds the ports 8 will be in alignment with the port 15. At very low speeds or when the housing 1 is stationary the springs 7 provides sufficient force to cause the valve to move inwards to close the port 15, and at certain higher speeds than idling speeds the centrifugal force on the valve 5 is sufficient to overcome the spring 6 when the valve moves to its outer position and again closes the port 15. The cap 46 is tied to the spring abutment 49 by means of the rod 48 and this serves to hold the spring 6 out of action at the predetermined low speeds and when the apparatus is stationary. The advantage obtained by using two separate springs is that the spring 7 can be much lighter than the spring 6 thereby causing the ports 8 to remain in alignment with the port 15 over a relatively large range of idling speeds. The drilling 44 serves an additional purpose and it will be observed that the clearance 45 passes beyond the drilling 44 before the ports 8 pass outwards beyond the port 15. This causes the liquid in the cylindrical bore 4 at the outer end of the piston 5 to be trapped. The force exerted by the valve on the trapped liquid causes it to leak past the abutment 49 and through the drilling 50. The trapped liquid damps the movement of the valve and prevents hunting. Such an arrangement provides suitable take up characteristics and ensures that the valve does not reopen except at minimum predetermined speeds.

We claim:

1. In a hydraulically actuated friction clutch having a rotary housing provided with a pressure space, the provision of a valve bore in said housing, a first inlet duct and an outlet duct in said housing for supplying fluid under pressure to and exhausting said fluid from said bore respectively, said outlet duct being located adjacent to the inner end of said valve bore, a movable valve element in said bore, said valve bore being disposed with one end further from the axis of said housing than the other end and so as to permit movement of said valve element under centrifugal action, the outer end of said valve bore being permanently closed against escape of fluid therefrom apart from escape through a working clearance of said element in said valve bore, said valve element having openings disposed between the ends of said element whereby said inlet and outlet ducts are brought into communication when said valve element is in an intermediate position in said valve bore, for exhausting said fluid under pressure, said openings being closed by the valve bore at opposite sides of said intermediate position, first and second resilient means both acting on said valve element in opposition to movement of said valve element caused by centrifugal force and said first resilient means serving to keep said valve element in exhaust closing positions during conditions of said housing from and including stationary to a low predetermined speed of rotation thereof, said first resilient means permitting and resisting movement of said valve element radially outwards to exhaust opening positions during speed conditions of said housing between stationary to said low predetermined speed, and said second resilient means being of greater force exerting capacity than the said first resilient means and permitting and resisting movement of said valve element radially outwards to a further extent to exhaust closing positions at speeds from said low predetermined speed to higher predetermined speeds, means to hold the said second resilient means inoperative during movement of the valve element from the innermost position of the said openings to the intermediate position of said openings and permitting said second resilient means to be operative during movement of the valve element from the intermediate position of said openings outwards, a second inlet duct in said housing leading from the said pressure space to the outer end of the said valve bore, said second inlet duct being controlled by said valve element, said valve element including a part thereof which closes said second inlet duct just prior to closing by said valve element of the first inlet duct on the outward movement of said valve element so as to trap oil and give a final slow closing cushioning effect.

2. Apparatus according to claim 1 wherein the said first and second resilient means consist of a first spring member and a second spring member respectively, said second spring member located between two abutment members linked together and movable towards each other against the action of said second spring member, one of said abutments engageable with said valve element and the other of said abutments engageable with said first spring member, the other end of said first spring member engageable by a cap member closing the end of said valve bore, and a small bore connecting said pressure space and the space in said valve bore between said valve element and said cap member, said first spring member being also engaging the cap member when the first spring member is compressed.

JOSEPH ARTHUR THOMPSON.
HOWARD FREDERICK HOBBS.

References Cited in the file of this patent

UNITED STATES PATENTS

| Number | Name | Date |
|---|---|---|
| 2,163,203 | Kegresse | June 20, 1939 |
| 2,275,204 | Smirl | Mar. 3, 1942 |
| 2,328,090 | Nutt et al. | Aug. 31, 1943 |
| 2,328,091 | Nutt et al. | Aug. 31, 1943 |
| 2,328,092 | Nutt et al. | Aug. 31, 1943 |
| 2,354,174 | Shmitter | July 18, 1944 |
| 2,377,350 | Marsh | June 5, 1945 |
| 2,398,907 | McCune | Apr. 26, 1946 |
| 2,440,589 | Kegresse | Apr. 27, 1948 |
| 2,462,657 | McNairy | Feb. 22, 1949 |

FOREIGN PATENTS

| Number | Country | Date |
|---|---|---|
| 604,304 | Great Britain | July 1, 1948 |
| 615,534 | Great Britain | Jan. 7, 1949 |